United States Patent
Gong et al.

(10) Patent No.: US 8,830,923 B2
(45) Date of Patent: Sep. 9, 2014

(54) BANDWIDTH ADAPTATION TECHNIQUES IN WIRELESS COMMUNICATIONS NETWORKS

(75) Inventors: Michelle X. Gong, Sunnyvale, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 12/941,021

(22) Filed: Nov. 5, 2010

(65) Prior Publication Data

US 2012/0113806 A1 May 10, 2012

(51) Int. Cl.
*H04W 72/08* (2009.01)

(52) U.S. Cl.
USPC ............ 370/329; 370/230; 455/452.1

(58) Field of Classification Search
CPC ............ H04W 72/085; H04W 84/18
See application file for complete search history.

(56) References Cited

U.S. PATENT DOCUMENTS

| | | | |
|---|---|---|---|
| 7,433,305 B2 * | 10/2008 | Hansson et al. ............. 370/229 |
| 2004/0048574 A1 * | 3/2004 | Walker et al. ............... 455/63.1 |
| 2005/0152357 A1 * | 7/2005 | Stephens ..................... 370/389 |
| 2007/0104152 A1 * | 5/2007 | Wild et al. .................... 370/335 |
| 2009/0150401 A1 * | 6/2009 | Allen et al. .................... 707/10 |
| 2009/0285116 A1 | 11/2009 | Nanda et al. |
| 2011/0268021 A1 * | 11/2011 | Trainin et al. ................. 370/328 |

FOREIGN PATENT DOCUMENTS

| | | |
|---|---|---|
| WO | 2012/061104 A2 | 5/2012 |
| WO | 2012/061104 A3 | 6/2012 |

OTHER PUBLICATIONS

International Search Report and Written Opinion received for PCT Patent Application No. PCT/US2011/057614, mailed on Apr. 24, 2012, 13 pages.
Letaief et al., "Dynamic Multiuser Resource Allocation and Adaptation for Wireless Systems", IEEE Wireless Communications, Aug. 2006, vol. 31, No. 4, pp. 38-47.
International Preliminary report on Patentability and Written Opinion received for PCT Application No. PCT/US2011/057614, mailed on May 16, 2013, 8 pages.
Skalli et al., "Channel Assignment Strategies for Multiradio Wireless Mesh Networks: Issues and Solutions" , Wireless Mesh Networks, vol. No. 45, Issue No. 11, Nov. 2007, pp. 86-93.

* cited by examiner

*Primary Examiner* — Jianye Wu
(74) *Attorney, Agent, or Firm* — Sutherland Asbill & Brennan LLP

(57) ABSTRACT

Techniques are disclosed that involve bandwidth adjustment in wireless communications networks. For instance, an operating bandwidth may be established for wireless communications with one or more remote devices. This operating bandwidth may include a primary channel and one or more secondary sub-channels. Further, one or more statistics may be maintained that correspond to one of the one or more sub-channels. These statistics may be based on based on events on the corresponding sub-channel(s), such collisions, interference events, medium busy events, etc. Based on such statistics, the operating bandwidth may be decreased. Moreover, embodiments may increase the operating bandwidth based on output queue depth statistics. Further, a notification may be transmitted that indicates a change in the operating bandwidth. This notification may be in the form of a bandwidth change indication (BCI) frame.

17 Claims, 5 Drawing Sheets

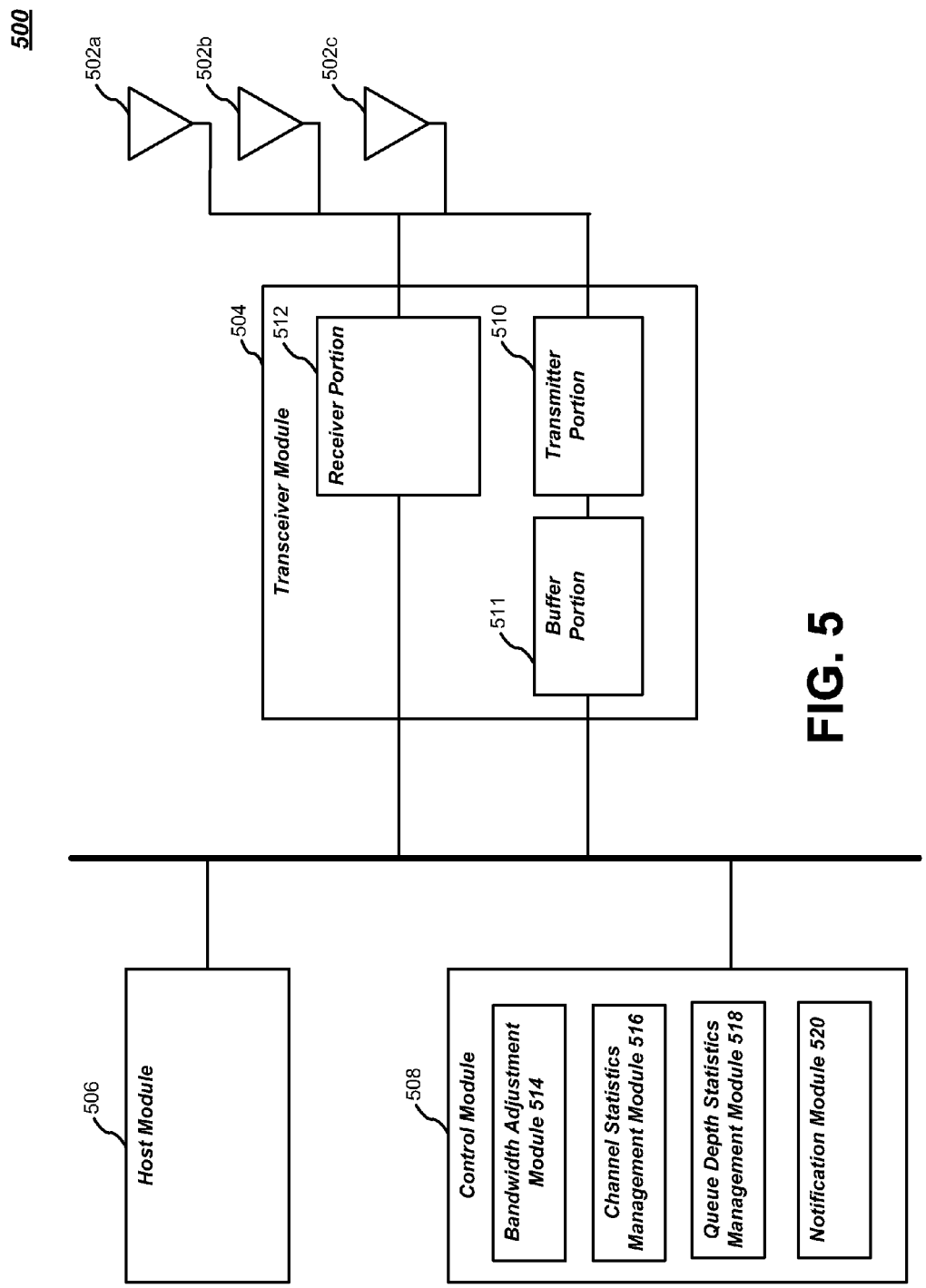

BANDWIDTH ADAPTATION TECHNIQUES IN WIRELESS COMMUNICATIONS NETWORKS

BACKGROUND

Wireless networks are becoming increasingly complex. For instance, networks, such as those provided by Institute of Electrical and Electronics Engineers (IEEE) 802.11 standards, may employ varying degrees of bandwidth. For instance, IEEE 802.11ac networks may employ bandwidths as large as 80 MHz or 160 MHz (depending on various factors). Such large bandwidths may be composed of multiple 20 MHz channels. For example, a bandwidth may include a 20 MHz primary channel and multiple 20 MHz sub-channels.

Moreover, such networks (e.g., IEEE 802.11 basic service sets (BSSs)) may operate in close proximity to each other. For instance, such networks may employ one or more of the same frequency channels. As a result, transmissions from such nearby networks may collide with each other. This may unfortunately reduce throughput in wireless networks.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 5 is a diagram showing an exemplary implementation within a wireless communications device.

DETAILED DESCRIPTION

Embodiments provide techniques that involve bandwidth adjustment in wireless communications networks. For instance, embodiments may establish an operating bandwidth for wireless communications with one or more remote devices. This operating bandwidth includes a primary channel and one or more sub-channels. Further, embodiments may maintain one or more statistics corresponding to one of the one or more sub-channels. Based on such statistics, the operating bandwidth may be decreased. Moreover, embodiments may increase the operating bandwidth based on statistics regarding output queue depth.

Such techniques may be employed in networks that (partially or wholly) operate in accordance with any past, present, or future IEEE 802.11 (WiFi) standard, or extension thereto. Embodiments, however, are not limited to such networks.

Figure 1:
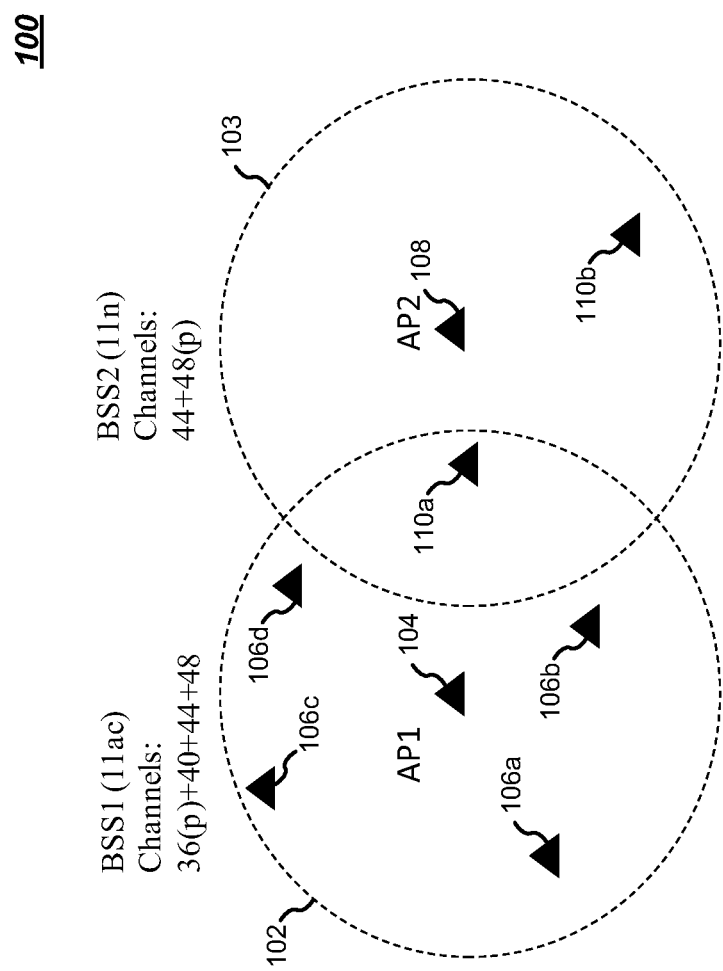
FIG. 1 is a diagram of an exemplary operational environment.

In wireless communications networks (e.g., in IEEE 802.11 networks, such as ones utilizing 40/80/160 MHz bandwidth), different basic service sets (BSSs) may choose overlapping frequency channels but different primary channels. FIG. 1 provides an example of such a scenario.

In particular, FIG. 1 is a diagram of an exemplary operational environment 100. This environment includes two overlapping BSSs (OBSSs): a first BSS 102, and a second BSS 103. BSS 102 includes an access point (AP) 104, and wireless stations (STAs) 106a-d. BSS 103 includes an AP 108, and STAs 110a-b. These devices may operate wholly or partially in accordance with various networking standards. Exemplary standards include (but are not limited to) one or more of the IEEE 802.11 WiFi standards. For instance, FIG. 1 shows BSS 102 operating in accordance with IEEE 802.11ac, and BSS 103 operating in accordance with IEEE 802.11n.

FIG. 1 shows that BSSs 102 and 103 employ different primary channels, but partially overlapping sub-channels. More particularly, for BSS 102, AP 104 selects channel number 36 as the primary channel, and channel numbers 40, 44, and 48 as sub-channels. For BSS 103, AP 108 selects channel number 48 as the primary channel, and channel number 44 as a sub-channel. Thus, BSSs 102 and 103 both employ channels 44 and 48.

In general operation, the devices within each particular BSS may engage in wireless communications with each other. Thus, within BSS 102, AP 104 and STAs 106a-d may communicate with each other. Similarly, within BSS 103, AP 108 and STAs 110a-b may communicate with each other. Such wireless communications may involve transmissions that utilize all or a portion of the corresponding BSS's channels.

Moreover, such wireless communications may employ contention-based access techniques, such as carrier sense multiple access with collision avoidance (CSMA/CA). CSMA/CA. CSMA/CA allows sharing of a channel through a carrier sensing scheme. More particularly, a device employs carrier sensing before it transmits a frame. The carrier sensing detects whether another signal from a remote device is being transmitted. In other words, the carrier sensing detects whether the medium is busy. If the medium is busy, then the device defers transmitting its frame, and waits for a time interval (also referred to as a "backoff delay") before re-trying to send the frame.

More particularly, a device may determine that a medium is busy through a combination of physical layer clear channel assessment (CCA) and MAC virtual carrier sensing. For physical layer CCA, if a device determines that there is signal on the air, it would record medium busy until the end of the signal. For MAC virtual carrier sensing, a device obtains the medium busy information through decoding a correctly received MAC frame.

As described herein, embodiments may generate statistics or data regarding a medium being busy (e.g., a medium busy percentage). For such statistics or data, a medium may be regarded as busy based on PHY CCA only. Alternatively, a medium may be regarded as busy based on a combination of PHY CCA and MAC virtual carrier sensing. Embodiments, however, are not limited to these examples.

In CSMA/CA, the determination of a collision may be made through the employment of an acknowledgment (ACK) procedure. Through this procedure, a transmitting device may conclude that a collision or interference has occurred when it does not receive an acknowledgment (e.g., an ACK packet) from the transmission's intended recipient. Embodiments, however, are not limited to identifying collisions through this procedure.

Additionally or alternatively, such wireless communications may involve multiple spatial streams. For instance, devices may employ between them one or more spatial transmit streams and one or more spatial receive streams. Such streams may be based on multiple-input, multiple-output (MIMO) techniques. Devices may employ such techniques with multiple antennas and/or multiple radiating elements.

In certain situations (e.g., during heavy traffic conditions), collisions may occur between common channel(s) employed by two overlapping BSSs. For instance, in the context of FIG. 1, when AP1 and AP2 both experience heavy traffic, frequent collisions may occur on channels 44 and 48.

In such situations, it is desirable for the operating bandwidth of one or both of the BSSs to be adjusted. For example, in the context of FIG. 1, it may be desirable for AP 104 (of BSS 102) to dynamically adjust its operating bandwidth when its non-primary channels experience frequent collisions or significant interference.

Due to analog hardware limitations, it may take considerable time (e.g., more than 20 microseconds) for a device to change bandwidth. Therefore, frequent or per-packet bandwidth adaptation is impractical, especially in higher bandwidth operations (e.g., 80 MHz or 160 MHz operation). Furthermore, even if a device is capable of changing channels on a per-packet basis, hidden nodes on secondary channels can still degrade the network performance. Accordingly, embodiments provide statistics-based slower bandwidth adaptation mechanisms.

With such slower bandwidth adaptation mechanisms, a transmitting device does not need to change its operating bandwidth on a per-packet basis. Instead, the transmitting device may adjust its operating bandwidth on a longer term basis. Such adjustments may be based on statistics collected over different channels.

In accordance with these techniques, a transmitting wireless communications device (e.g., an AP and/or STA) that is experiencing frequent collisions, significant interference, and/or significant busy time on non-primary channels may record the channels that have experience such conditions. When collisions, significant interference, and/or significant busy time on one or more sub-channels reach a certain level (e.g., a certain percentage, a certain threshold within a moving time window, etc.), the device flags these sub-channel(s). Then, the device reduces its bandwidth for subsequent transmissions to avoid the flagged channel(s).

Upon making this reduction, the device transmits over the reduced bandwidth. However, when a condition calling for an increase in its bandwidth occurs, then the device may increase its bandwidth for sending transmissions. Such an increase may involve adding one or more sub-channels to its bandwidth. Various conditions may be employed. For example, bandwidth may be increased when the device's transmit buffer length increases beyond a threshold. Embodiments, however, are not limited to this example.

Figure 2:
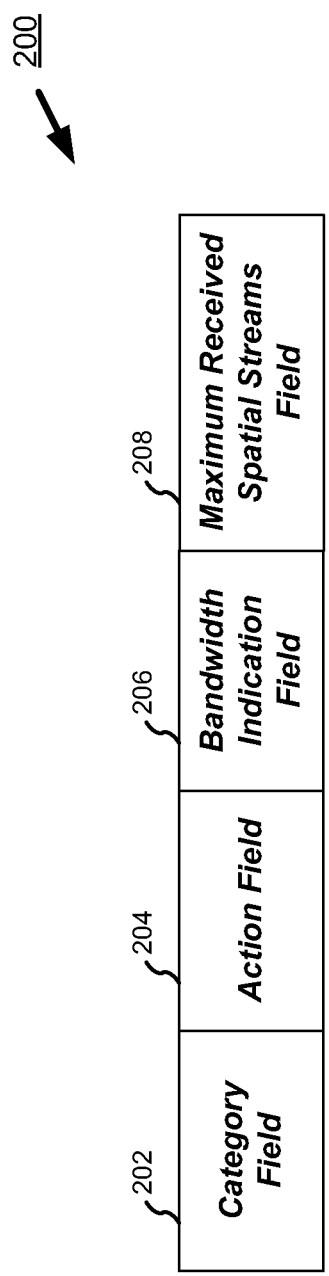
FIG. 2 is a diagram of an exemplary message format.

In embodiments, the transmitting device notifies its receivers when it intends to change its operating bandwidth. For instance, the transmitting device may employ a bandwidth change indication (BCI) frame to make such a notification. FIG. 2 is a diagram showing an exemplary format 200 within a bandwidth change indication frame.

As shown in FIG. 2, this format includes a category field 202, an action field 204, a bandwidth indication field 206, and a maximum received spatial streams field 208. Embodiments, however, are not limited to this combination of fields.

Category field 202 identifies the action frame as a bandwidth change indication frame. Action field 204 indicates whether the transmitting bandwidth is being increased or decreased (e.g., whether sub-channel(s) are being added or removed). Bandwidth indication field 206 indicates of the channel(s) (e.g., by channel number) that are being added or deleted.

Maximum received spatial streams field 208 indicates the maximum number of receive spatial streams (Nss) that the receiving device will be able to receive. Thus, when a device (e.g., an AP and/or STA) receives a BCI frame having this field, it will know not to transmit more than the indicated Nss number of spatial streams to the device that originated the BCI frame. This feature may advantageously allow for devices to manage power consumption, as the number of receive spatial streams that a device employs affects the device's power consumption. This is because separate receiver chains are typically required for each receive spatial stream.

Additionally or alternatively, embodiments may employ beacon transmissions to notify receivers of bandwidth changes. Within such beacon transmissions, the information of one or more of the fields of FIG. 2 may be included as information elements (IEs).

Through these techniques, employed bandwidth may be effectively adapted based on various performance characteristics (e.g., collisions, interference, and/or buffer length). However, in embodiments, involving IEEE 802.11 networks, such bandwidth adaptations may refrain from changing the primary channel of a BSS. Thus, in embodiments, a BCI frame may be employed to change (add or remove) sub-channels. However, to change a primary channel, an Extended Channel Switch Announcement frame may be transmitted.

Operations for embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. Embodiments are not limited to this context.

Figure 3:
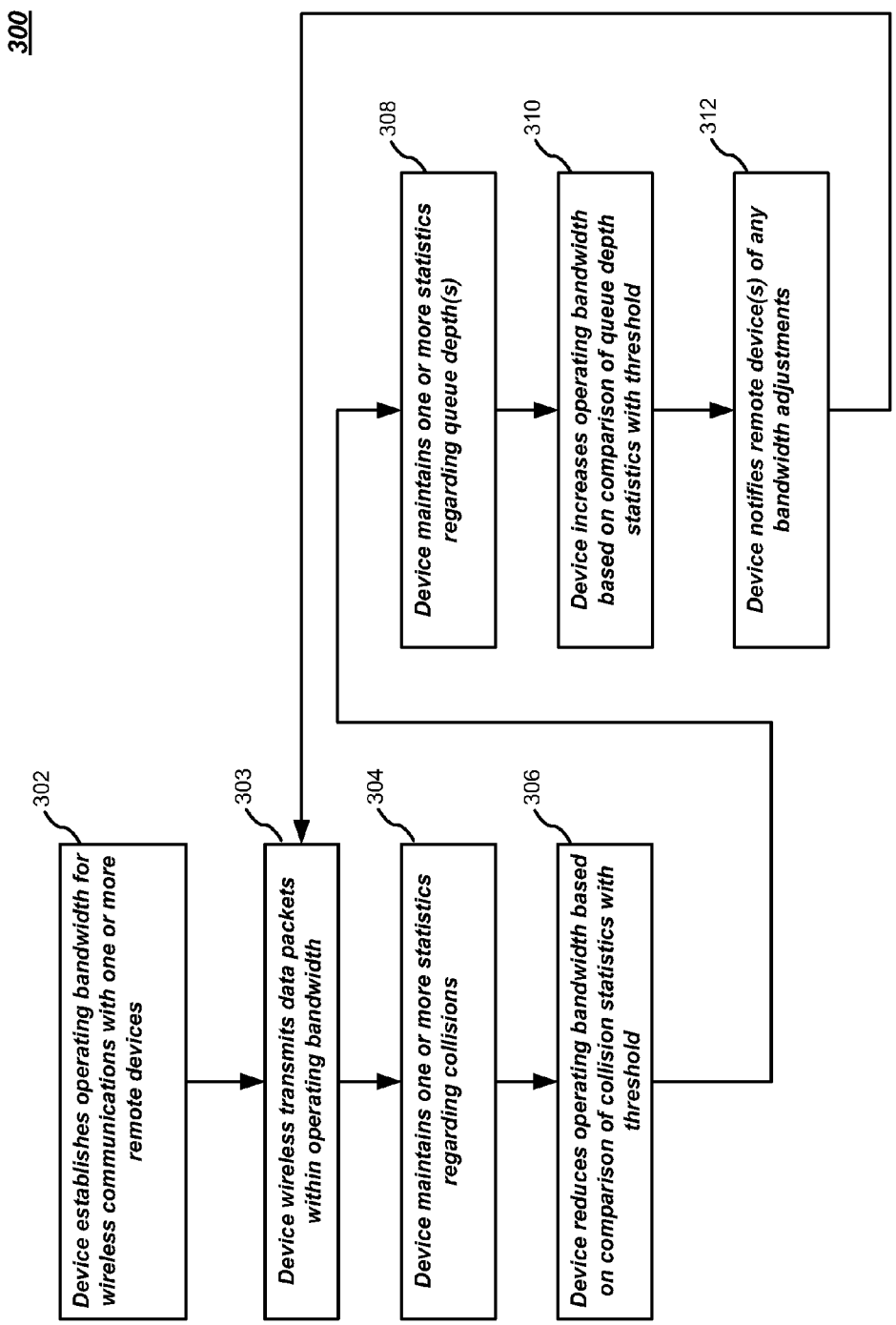
FIGS. 3 and 4 are logic flow diagrams.

FIG. 3 illustrates an exemplary logic flow 300, which may be representative of operations executed by one or more embodiments described herein. Thus, this flow may be employed in the contexts of FIG. 1. Embodiments, however, are not limited to this context. Also, although FIG. 3 shows particular sequences, other sequences may be employed. Moreover, the depicted operations may be performed in various parallel and/or sequential combinations.

The operations of FIG. 3 are described in the context of a device (also referred to as a transmitting device) that can send wireless transmissions to one or more remote devices. In embodiments, the device and the one or more remote devices may form an IEEE 802.11 BSS. Further, in the context of IEEE 802.11, the transmitting device may be an AP or a STA. Embodiments, however, are not limited to IEEE 802.11 networks or to BSSs.

At a block 302, the device establishes an operating bandwidth for wireless communications with the one or more remote devices. This operating bandwidth includes a primary channel and one or more sub-channels. These channels may have various individual bandwidths. For instance (as in IEEE 802.11 networks), the primary channel and each sub-channel may have a 20 MHz bandwidth. Embodiments, however, are not limited to this exemplary channel bandwidth.

At a block 303, the device wirelessly transmits information (e.g., data packets) within the operating bandwidth to one or more remote devices. Such wireless transmissions may be (wholly or partially) in accordance with one or more IEEE 802.11 wireless network standards.

At a block 304, the device maintains one or more statistics (e.g., counts, percentages, ratios, etc.). Each of such statistic(s) corresponds to one of the sub-channels in the operating bandwidth. In embodiments, each of the statistic(s) indicates a number of collisions or failed transmissions or the medium busy percentage on the corresponding sub-channel over a moving time window. As indicated by a block 306, the device may reduce the operating bandwidth based on comparing statistics maintained at block 304 with one or more thresholds.

At a block 308, the device maintains one or more statistics (e.g., counts, percentages, ratios, etc.). Each of these statistic(s) corresponds to the depth of the device's output queue(s) (e.g., in the context of IEEE 802.11, the device's access category queue(s)). In embodiments, a count for each queue indicates the corresponding queue's depth over a moving time window. Or, a count is maintained for the combined queue depth over a moving time window. As indicated by a block 310, the device may increase the operating bandwidth based on comparing statistics maintained at block 308 with one or more thresholds.

Accordingly, at a block 312, the device notifies the remote device(s) of any bandwidth adjustment (e.g. a decrease at block 306 or an increase at block 308). In embodiments, this notification may comprise transmitting one or more BCI frames. Such BCI frame(s) may be formatted as described above with reference to FIG. 2. Additionally or alternatively, this notifying may comprise sending one or more beacon transmissions. Such beacon transmission(s) may include information elements (IEs) that convey information described above with reference to FIG. 2.

Following receipt of such notification, the device may communicate with one or more of the remote devices in accordance over the adjusted operating bandwidth. Thus, FIG. 3 shows that following block 312, operation may return to block 303.

Thus, a device may increase or decrease its operating bandwidth by adding or removing sub-channels that it employs. In embodiments, the device may use different operating bandwidths for different remote devices. Further, the device may determine to increment or decrement the operating bandwidth for some or all the remote device(s). Such device-by-device determinations may be based on one or more factors, such as each remote device's bandwidth capabilities. Therefore, in embodiments, notifications of bandwidth adjustments (e.g., BCIs and/or beacon IEs) may be addressed to one or more specific remote devices.

Figure 4:
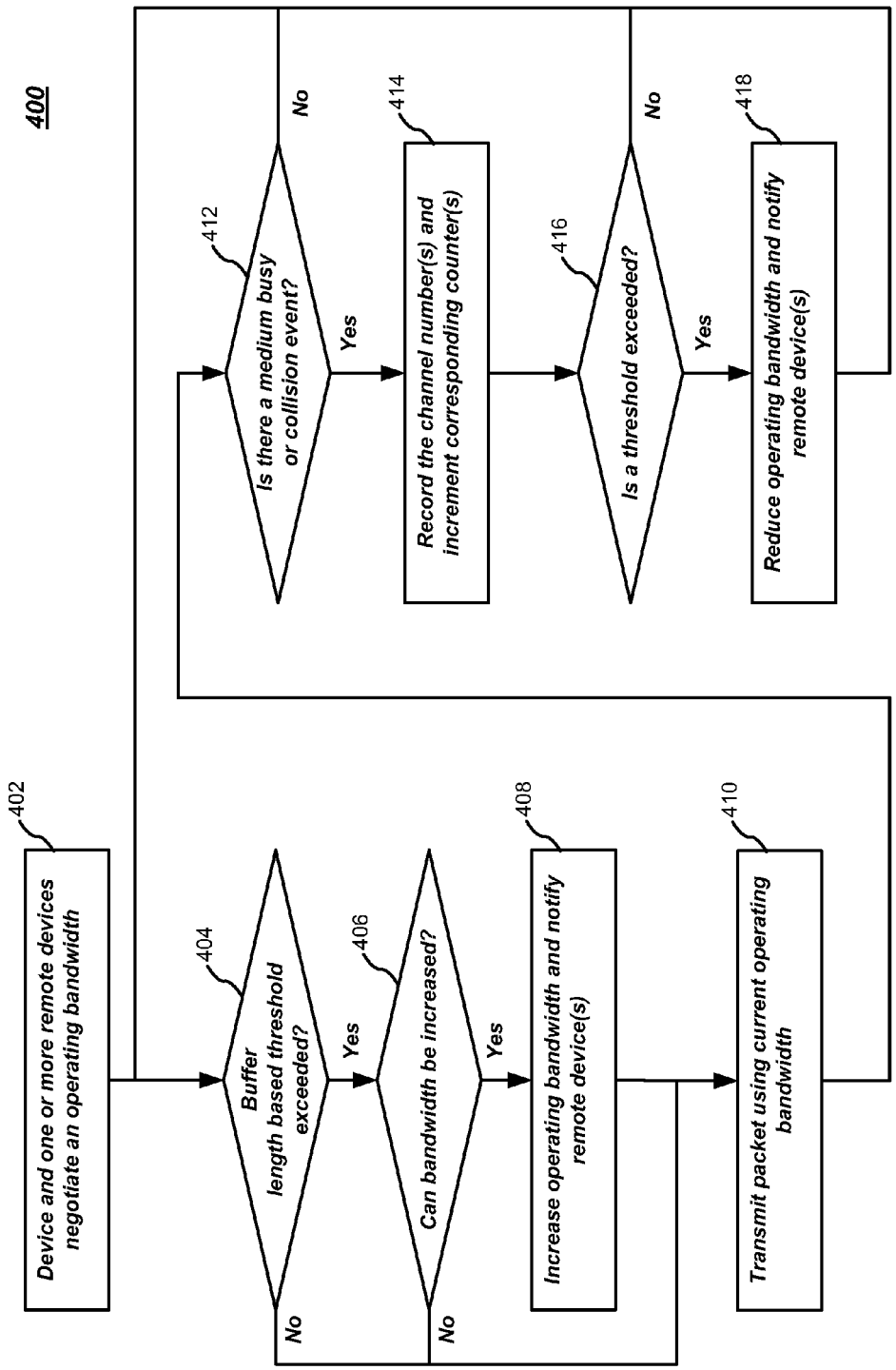

FIG. 4 illustrates a further exemplary logic flow 400, which may be representative of operations executed by one or more embodiments described herein. Thus, this flow may be employed in the contexts of FIG. 1. Embodiments, however, are not limited to this context. Although FIG. 4 shows particular sequences, other sequences may be employed. Moreover, the depicted operations may be performed in various parallel and/or sequential combinations. Also, operation(s) of FIG. 4 may be combined in any manner with operation(s) of FIG. 3.

The logic flow of FIG. 4 provides an example of a statistics-based bandwidth adaptation mechanism. The operations of FIG. 4 are described in the context of a device that can send wireless transmissions to one or more remote devices. In embodiments, the device and the one or more remote devices may form an IEEE 802.11 BSS (e.g., an IEEE 802.11ac BSS). Embodiments, however, are not limited to IEEE 802.11 networks or BSSs.

FIG. 4 shows that this flow includes a block 402, at which the device and the one or more remote devices negotiate an operating bandwidth (BW). Such negotiations may involve the exchange of one or more control messages. This operating bandwidth may include a primary channel and one or more sub-channels. These channels may have various individual bandwidths. For instance (as in IEEE 802.11 networks), the primary channel and each sub-channel may have a 20 MHz bandwidth. Embodiments, however, are not limited to this exemplary channel bandwidth.

The device maintains one or more statistics regarding the queue depth for its one or more output queues (or buffers). For instance, in the context of IEEE 802.11 ac, the transmitting device may maintain such statistic(s) for each of its access category (AC) queues. Alternatively, the transmitting device may maintain such statistic(s) for the combined output queue, which can be a buffer that contains the packets before they are classified into different ACs. Exemplary statistics include a moving average queue depth and/or current queue depth. However, other additional or alternative statistics may be employed in any combination.

Such statistic(s) indicate whether the network capacity provided by the current operating BW is sufficient. This indication may be based by comparing such statistic(s) to corresponding threshold(s). For instance, at a block 404, the device determines whether such a statistic exceeds a predetermined threshold. If so, then the device determines that the current operating bandwidth should be increased and operation proceeds to a block 406. Otherwise, operation proceeds to a block 410.

At block 406, the device determines whether it is capable of increasing the operating bandwidth. This may comprise determining whether an allocation limit has already been reached (e.g., 40/80/160 MHz in IEEE 802.11ac networks, and 40 MHz in IEEE 802.11 networks). Additionally or alternatively, this may determine whether an increase in bandwidth would exceed bandwidth capabilities of one or more of the remote device(s). Embodiments, however, are not limited to these examples. If the device can increase the operating bandwidth, then operation proceeds from block 406 to a block 408. Otherwise, operation proceeds to a block 410.

At block 408, the device increases the operating bandwidth and notifies the remote device(s) of this increase. In embodiments, this comprises adding one or more sub-channels and wirelessly transmitting a notification (e.g., a BCI frame or a beacon having IEs indicating the increase). Additionally, as described above, the notification may indicate the maximum number of receive spatial streams (Nss) that the device will be able to receive. After the notification (e.g., BCI frame or beacon) has been successfully received, both the transmitter and the receiver change its operating BW to the new BW.

At block 410, the device transmits a packet using the current operating bandwidth. In embodiments, this transmission may be made in accordance with a contention-based access scheme, such as CSMA/CA. Embodiments, however, are not limited to CSMA/CA or to contention-based access schemes.

Further, at a block 412, the device determines whether there was a collision in the packet transmission at block 410. If so, then operation proceeds to a block 414. Otherwise, operation returns to block 404.

As described herein, transmitting devices may maintain statistics regarding collisions/interference events or medium busy events. For instance, the transmitting device may maintain a counter for each of its sub-channels (e.g., 20 MHz sub-channels) and record the number of collisions on these sub-channels over a moving window. If a collision is detected over a sub-channel, the collision is recorded. Additionally or alternatively, the transmitting device may maintain a counter for each of its sub-channels (e.g., 20 MHz sub-channels) and record the medium busy percentage on these sub-channels over a moving window.

Accordingly, at block 414, the device updates its collision statistics based on the detected collision. This may involve recording the channel number(s) associated with the collision and incrementing counter(s) corresponding to the channel number(s). From this, further statistics may be generated, such as a percentage of collisions for the corresponding channel(s). The device may also update the medium busy percentage on secondary channels based on carrier sense mechanisms. As described above, such counters and/or statistics may be maintained over a moving time window.

At a block 416, the device determines whether one or more statistics (e.g., collision count, percentage of collisions, or percentage of medium busy, etc.) associated with any of its employed channels exceeds a predetermined threshold. If so, then operation proceeds to a block 418. Otherwise, operation returns to block 404.

At block 418, the device reduces its operating bandwidth and notifies the remote device(s) of this decrease. In embodiments, this comprises removing one or more sub-channels and wirelessly transmitting a notification (e.g., a BCI frame or a beacon having IEs indicating the decrease). Additionally, as described above, the notification may indicate the maximum number of receive spatial streams (Nss) that the device will employ. After the notification (e.g., BCI frame or beacon) has been successfully received, both the transmitter and the receiver change its operating BW to the new BW.

As described herein, a device may increase or decrease its operating bandwidth by adding or removing sub-channels that it employs. In embodiments, the device may use different operating bandwidths for different remote devices. Further, the device may determine to increment or decrement the operating bandwidth for some or all the remote device(s). Such device-by-device determinations may be based on one or more factors, such as each remote device's bandwidth capabilities. Therefore, in embodiments, notifications of bandwidth adjustments (e.g., BCIs and/or beacon IEs) may be addressed to one or more specific remote devices.

FIG. 5 is a diagram of an implementation 500 that may be included in a wireless device, such as an AP or a STA (e.g., any of AP 104, AP 108, STAs 106a-d, and STAs 110a-b). Implementation 500 may include various elements. For example, FIG. 5 shows implementation 500 including multiple antennas 502a-c, a transceiver module 504, a host module 506, and a control module 508. These elements may be implemented in hardware, software, or any combination thereof.

Antennas 502a-c provide for the exchange of wireless signals with remote devices. Although three antennas are depicted, any number of antennas (e.g., one or more) may be employed. Also, embodiments may employ one or more transmit antennas and one or more receive antennas. Such multiple antenna arrangements may be employed for beamforming and/or the employment of multiple spatial streams with a remote device.

Transceiver module 504 provides for the exchange of information with other devices. As shown in FIG. 5, transceiver module 504 includes a transmitter portion 510, a receiver portion 512, and a buffer portion 513. During operation, transceiver module 504 provides an interface between antennas 502a-c and other elements, such as host module 506, and control module 508. For instance, transmitter portion 510 receives symbols from such elements (e.g., through buffer portion 513), and generates corresponding signals for wireless transmission by one or more of antennas 502a-c. This may involve operations, such as modulation, amplification, and/or filtering. However, other operations may be employed.

Conversely, receiver portion 512 obtains signals received by one or more of antennas 502a-c and generates corresponding symbols. In turn, these symbols may be provided to elements, such as host module 506 and control module 508. This generation of symbols may involve operations, including (but not limited to) demodulation, amplification, and/or filtering.

The signals generated and received by transceiver module 504 may be in various formats. For instance, these signals may be modulated in accordance with an orthogonal frequency division multiplexing (OFDM) based scheme. However, other schemes and formats may be employed.

To provide such features, transmitter portion 510 and receiver portion 512 may each include various components, such as modulators, demodulators, amplifiers, filters, buffers, upconverters, and/or downconveters. Such components may be implemented in hardware (e.g., electronics), software, or any combination thereof.

Buffer portion 513 buffers information, such as packets, for wireless transmission by transmitter portion 510. In embodiments, buffer portion 513 may include one or more output queues. For example, in the context of IEEE 802.11, buffer portion 513 may include one or more access category (AC) queues. Buffer portion 513 may be implemented in any combination of hardware and/or software. For instance, buffer portion 513 may include a storage medium (e.g., memory) to store information that is designated for transmission.

The symbols exchanged between transceiver module 504 and other elements may form messages or information associated with one or more protocols, and/or with one or more user applications. Thus, these elements may perform operations corresponding to such protocol(s) and/or user application(s). Exemplary protocols include (but are not limited to) various media access control and discovery protocols. Exemplary user applications include telephony, messaging, e-mail, web browsing, content (e.g., video and audio) distribution/reception, and so forth.

Moreover, in transmitting signals, transceiver module 504 may employ various access techniques. For example, transceiver module 504 may employ a contention-based technique, such as CSMA/CA. Embodiments, however, are not limited to such techniques.

In embodiments, control module 508 may perform various operations described herein. For instance, FIG. 5 shows control module 508 including a bandwidth adjustment module 514, a channel statistics management module 516, a queue depth statistics management module 518, and a notification module 520. These elements may be implemented in any combination of hardware and/or software.

Bandwidth adjustment module 514 makes bandwidth adjustments in accordance with the techniques described herein. Such adjustments may be based on statistics received from channel statistics management module 516 and queue depth statistics management module 518. For instance, bandwidth adjustment module 514 may determine whether bandwidth adjustments are to be made when it determines that such statistics exceed predetermined threshold values.

Upon determining that a bandwidth adjustment is to be made, bandwidth adjustment module 514 directs notification module 520 to generate a notification (e.g., a BCI frame). In turn, notification module 520 may send the notification to transceiver module 504 for wireless transmission. In a similar manner, notification module 520 may generate IEs related to bandwidth adjustments for incorporation into a beacon.

Channel statistics management module 516 maintains statistics related to collisions, medium busy percentage, etc., as described herein. Accordingly, channel statistics management module 516 may receive notification of collision events or medium busy events from transceiver module 504. In turn, module 516 may provide corresponding statistics to bandwidth adjustment module 514.

Queue depth statistics management module 518 maintains statistics related to queue depth(s) within buffer portion 513 of transceiver module 504. Accordingly, module 518 may receive status information from buffer portion 513. In turn, module 518 may provide corresponding statistics to bandwidth adjustment module 514.

Host module 506 may exchange symbols with transceiver module 504 that correspond to wireless signals exchanged with remote devices. These symbols may form messages or information associated with one or more protocols, and/or one or more user applications. Thus, host module 506 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, embodiments are not limited to contexts involving IEEE 802.11 networks. Moreover, embodiments are not limited to particular types of BSSs, or working with 20 MHz channels.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
    establishing an operating bandwidth for wireless communications with one or more remote devices, the operating bandwidth comprising a primary channel and one or more sub-channels;
    maintaining one or more statistics, each of the one or more statistics corresponding to one of the one or more sub-channels, wherein each of the one or more statistics comprises at least one of: (i) a number of collision events or (ii) medium busy events on the corresponding sub-channel;
    reducing the operating bandwidth when at least one of the one or more statistics exceeds a predetermined threshold; and
    notifying the one or more remote devices of said reducing.

2. The method of claim 1, wherein said reducing comprises removing one of the one or more sub-channels from the operating bandwidth.

3. The method of claim 1, wherein said notifying comprises wirelessly transmitting a bandwidth change indication (BCI) frame.

4. The method of claim 1, wherein said notifying comprises indicating a maximum number of receive spatial streams.

5. The method of claim 1, further comprising:
    increasing the operating bandwidth when a statistic associated with an output queue exceeds a predetermined threshold.

6. The method of claim 5, wherein said increasing comprises adding a sub-channel to the operating bandwidth.

7. The method of claim 5, further comprising notifying the one or more remote devices of said increasing.

8. The method of claim 7, wherein said notifying comprises indicating a maximum number of spatial receive streams.

9. The method of claim 7, wherein said notifying comprises wirelessly transmitting a bandwidth change indication message.

10. The method of claim 1, wherein the primary channel has a 20 MHz bandwidth, and each of the one or more sub-channels has a 20 MHz bandwidth.

11. The method of claim 1, further comprising wirelessly transmitting information to the one or more remote devices in accordance with an IEEE 802.11 wireless network standard.

12. An apparatus, comprising:
    a transceiver module to wirelessly transmit information to one or more remote devices within an operating bandwidth;
    a bandwidth adjustment module to adjust the operating bandwidth based on at least one of: (i) a number of collision events; (ii) medium busy events; or (iii) a condition of one or more output queues; and
    a notification module to generate a notification of said adjustment of the operating bandwidth, wherein the transceiver module is configured to wirelessly transmit the notification to the one or more remote devices.

13. The apparatus of claim 12, wherein said adjusting the operating bandwidth comprises adding one or more sub-channels to the operating bandwidth.

14. The apparatus of claim 12, wherein the bandwidth adjustment module decreases the operating bandwidth when one or more statistics exceeds a predetermined threshold.

15. The apparatus of claim 14, wherein said decreasing the operating bandwidth comprises removing one or more sub-channels from the operating bandwidth.

16. The apparatus of claim 12, wherein said notification includes a maximum number of spatial receive streams to be employed by said apparatus.

17. An article comprising a non-transitory machine-accessible medium having stored thereon instructions that, when executed by a machine, cause the machine to:
   establish an operating bandwidth for wireless communications with one or more remote devices, the operating bandwidth comprising a primary channel and one or more sub-channels;
   maintain one or more statistics, each of the one or more statistics corresponding to one of the one or more sub-channels, wherein each of the one or more statistics comprises at least one of: (i) a number of collision events or (ii) medium busy events on the corresponding sub-channel;
   reduce the operating bandwidth when at least one of the one or more statistics exceeds a predetermined threshold; and
   notify the one or more remote devices of said reducing.

\* \* \* \* \*